United States Patent [19]
Dimitri

[11] 3,886,093
[45] May 27, 1975

[54] ACTIVATED CARBON WITH ACTIVE METAL SITES AND PROCESS FOR PRODUCING SAME

[75] Inventor: Mitchell S. Dimitri, Charleston, S.C.

[73] Assignee: Westvaco Corporation, New York, N.Y.

[22] Filed: Dec. 14, 1973

[21] Appl. No.: 424,844

[52] U.S. Cl. .............. 252/447; 201/25; 252/422; 423/449
[51] Int. Cl. ............................................ C01b 31/08
[58] Field of Search ................ 252/422, 425, 447; 423/449, 447; 201/25

[56] References Cited
UNITED STATES PATENTS

| | | | |
|---|---|---|---|
| 1,530,536 | 3/1925 | Adler | 252/425 |
| 1,535,797 | 4/1925 | Wickenden | 252/422 |
| 1,535,798 | 4/1925 | Wickenden | 252/422 |
| 1,559,054 | 10/1925 | Smith | 252/422 |
| 3,053,775 | 9/1962 | Abbott | 252/447 |
| 3,461,082 | 8/1969 | Otani et al. | 252/422 |
| 3,617,481 | 11/1971 | Voorhies, Jr. | 252/447 |

*Primary Examiner*—Winston A. Douglas
*Assistant Examiner*—P. E. Konopka
*Attorney, Agent, or Firm*—Richard L. Schmalz; Ernest B. Lipscomb, III

[57] ABSTRACT

Activated carbons having uniformly distributed active metal sites are described. A process for making the carbons of this invention comprises, precipitating a lignin solution with various transition metal salts to form a metal lignate slurry, drying the precipitated metal lignate, carbonizing and activating the metal lignate to produce activated carbon with active metal sites. The activated carbons with active metal sites produced according to this process are particularly characterized by having the metal sites uniformly distributed throughout the carbon particle and are useful for catalytic and sorption applications.

9 Claims, 1 Drawing Figure

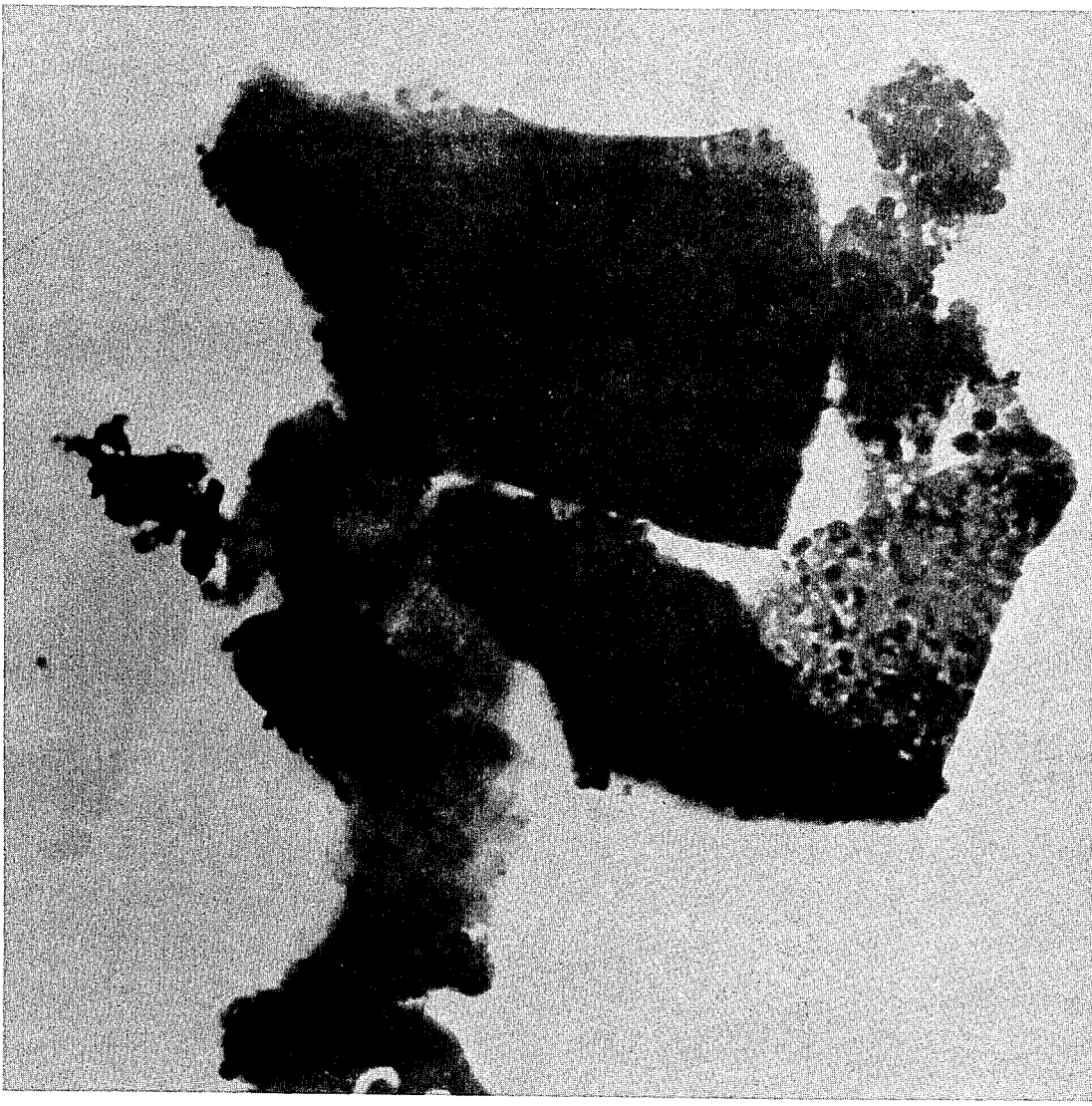

ACTIVATED CARBON WITH ACTIVE METAL SITES AND PROCESS FOR PRODUCING SAME

BACKGROUND OF THE INVENTION

1. Field of the Invention

This invention relates to activated carbon particles having active metal sites uniformly distributed throughout. More particularly, the present invention relates to a process for making activated carbon with active metal sites from lignin by precipitating lignin and a salt solution of a transition metal to form as metal lignate, drying and activating the metal lignate.

2. The Prior Art

In sorption processes it has been found that the existence of certain metals on the sorbent used in the processes greatly enhances the efficiencies and selectivities of the process. Likewise in a metal catalytic process, the use of activated carbon impregnated with the particular metal has greatly enhanced the efficiencies of the catalytic process.

In the past, activated carbon has been impregnated with the various transition metals such that a carbon metal surface area was achieved thereby giving the activated carbon the desired properties. One particular drawback to the process of impregnating activated carbon with the various metals is that the small pores were inaccessible to liquid penetration. The minute pores that exist on the surface of the activated carbon particle, are small enough to prevent the entry of the metal and therefore uniform and thorough impregnation of the carbon particle is prevented.

It is therefore the general object of this invention to provide an activated carbon with a predetermined percentage of active metal sites uniformly distributed throughout the activated carbon.

Another object of this invention is to provide an activated carbon manufactured from a lignin that has been precipitated with a water soluble metal salt thereby forming a metal lignate which is then carbonized and activated.

Still another object of the present invention is to provide a process by which the percentage of metal, as well as, the location of the metal in the pore of an activated carbon particle can be precisely and accurately regulated.

It is also an object of the present invention to incorporate metal sites into activated carbon in areas, heretofore, not available to metals because of the large metal molecules. The thus manufactured activated carbon from metal lignates have the advantage of uniform distribution of metal sites, particularly in pores which might otherwise not be accessible in metal impregnated products. Additionally, activated carbon produced from metal lignates may have a large particle size, which is beneficial to some chemical processes depending upon metal sites in activated carbon. Furthermore, metal lignates from modified lignins, such as lignins modified with formaldehyde, hexamethylene tetramine and others, provide different and advantageous sorption and catalytic properties not found in metal impregnated activated carbon.

Even yet another object of this invention to provide a process for producing activated carbon from metal lignates by precipitating a lignin with a metal salt to form a metal lignate, separating any excess metal from the metal lignate, washing the metal lignate, drying the metal lignate, carbonizing and finally activating the metal lignate.

Various other objects, distinctions and advantageous features of the present invention will become apparent from the description of the preferred embodiments below.

BRIEF DESCRIPTION OF THE DRAWING

The FIGURE is an electron micrograph of an activated carbon containing active metal salts of cobalt magnified 55,700 times and made according to the process of this invention.

DESCRIPTION OF THE PREFERRED EMBODIMENTS

The lignins employed to make the activated carbons of this invention include alkali lignins from the sulfate pulping process and lignins derived from other alkaline processes, such as the soda or modified soda processes. One of the main sources of lignin is the residual pulping liquors of the paper and pulp industries where lignocellulosic materials, such as wood, straw, corn stalks, bagasse, and the like are processed to separate cellulose or pulp from the lignin. It is also essential in the practice of this invention to employ lignin which is a by-product of alkaline pulping wherein the pulping liquor contains sodium hydroxide, or the sulfate process, wherein the pulping liquor contains both sodium hydroxide and sodium sulfide or a lignin which is chemically similar thereto. Such a lignin is generally referred to in the art as "alkali lignin" and is to be distinquished from sulfite lignin, which is the by-product of pulping lignocellulosic material with bisulfite and sulfur dioxide and which occurs in the form of a lignosulfonic acid in the sulfite waste liquor and can be precipitated by means of alkaline earth salts in effecting its recovery in the from of a salt. Such lignosulfonic compounds do not possess the attributes required for use according to this invention, but this does not necessarily preclude the possibility of chemically treating sulfite lignin, so as to reduce the inorganic material and convert the lignin to a form having utility for use according to the process of the present invention.

The alkali lignin is employed in its salt form, such as a sodium, potassium or ammonium salt of the lignin. This is necessary in order for the lignin to be soluble in an aqueous solution and to thereby form chemical bonds with the metal in the metal salt solution. As an example, lignins which are particularly advantageous for use in the process of the subject invention are the sodium salt of a free-acid alkali lignin sold under the trade name INDULIN AT. INDULIN AT is a dry free-acid lignin product obtained from the kraft pulping process and is available from Westvaco Corporation. Additionally, the lignin starting material in a solution form, as the sodium salt of alkali lignin sold under the trade name INDULIN B available from Westvaco Corporation, is also highly desirable.

Although the water soluble salt of alkali lignins are preferred for use in the subject invention, it has been found that other particularly effective lignins are useful in the process of this invention and include lignins which have been modified by reaction with formaldehyde or lignins that have been modified by reaction with hexamethylene tetramine such as those high surface area lignins described in U.S. Pat. No. 3,697,497 to Falkehag, and incorporated herein by reference.

The metal salts which are contemplated for use in the process of the subject invention are those bivalent or higher valent transition metals which are water soluble and will form chemical bonds between the metal and lignin and thus will serve to precipitate the lignin. Examples of these transition metals include, among others, aluminum, nickel, cobalt, copper and iron. Other transition metals include chromium, magnesium, titanium and vanadium.

The lignin is either dissolved in an aqueous solution, or is in solution as purchased. The lignin solution is simply mixed with the metal salt which has been dissolved in an aqueous solution at a metal salt to lignin mol ratio of 2:1 to 1:1 or less. It is generally preferred that a slight excess of metal salt to lignin on a solids basis be present in order to obtain sufficient and thorough metal throughout the precipitated metal lignate. The concentration of both the lignin in solution and metal ion in solution is not critical but concentrations in the range of one percent to 50 percent solids or even higher have been found to be quite satisfactory. The metal ion reacts form a chemical bond with the lignin and in so doing precipitates the lignin from the solution. The percentage of metal salt to lignin is not critical so long as sufficient metal is present in the final activated carbon product to obtain the desired effects during the sorption or catalytic process, whichever is contemplated.

The activated carbons having active metal sites uniformly distributed throughout the carbon particles may be made by a process of the following general description.

A lignin solution is prepared from either an alkali lignin or ammonium lignate by dissolving the lignin salt in an aqueous solution. A water soluble metal salt of a bivalent or higher valent transition metal is dissolved in an aqueous solution and mixed with the lignin solution to precipitate the metal and lignin as a metal lignate slurry. The time required to complete the precipitation is less than one hour and usually 30 minutes will more than satisfactorily suffice. The temperature at which the lignin and metal are mixed is not important and the metal lignate reaction is generally carried out at room temperature. The precipitated metal lignate is separated from the slurry by filtration or centrifugation or the like, and if desired, washed to remove any excess metal salt solution.

Next, the wet metal lignate precipitate is dried, often at a temperature between 200°F. and 250°F. The dry metal lignate is then made into an activated carbon by carbonizing at a temperature of 700°F. to 1,800°F. in conventional carbonizing equipment, such as a fluidized bed or rotary kiln operation. The carbonized metal lignate is then activated at a temperature from 1,400°F. to 1,950°F. or even higher in a conventional carbon activating process to produce the activated carbon containing active metal sites. Alternatively, the wet metal lignate precipitate may be dried and carbonized concurrently in a spray dryer, fluidized bed dryer or other conventional drying means. As yet another embodiment of the process, the carbonizing and activating of a dry metal lignate may be accomplished in the same step.

As stated, the metal lignate is removed from the solution in which it has been precipitated either through filtration, centrifugation, or the like. The wet metal lignate may then be dried at say 700°F. or below, preferably 200°F. to 250°F., or dried and carbonized concurrently. Drying of the metal lignate is not in itself critical to forming an activated carbon product having active metal sites contained throughout. However, the method of drying is necessary to obtaining a high surface area of the end product, if desired. One such process suitable for obtaining dry lignins having a high surface area is disclosed in U.S. Pat. No. 3,808,192 issued Apr. 30, 1974. Although it is not necessary to use the drying method such as that described in U.S. Pat. No. 3,808,192 in order to obtain a high surface area, it has been found desirable, to obtain even more preferred products of the activated carbon to begin the carbonation and activation steps with a dry metal lignate already having a high surface area, such as greater than five square meters per gram. Again, it is stated that any drying method will suffice to dry the product of the present invention in order to produce a satisfactory activated carbon containing active metal sites.

The actual steps of carbonizing and activating the metal lignates are more or less conventional and well known to those skilled in the art of producing activated carbons. There are many methods by which carbonizing and activating are accomplished and any effective method can be used in the present invention.

It has been found that the activated carbons produced according to the process of the subject invention, and clearly shown in the FIGURE accompanying this application, contain active metal sites uniformly distributed throughout the activated carbon particle. Additionally, it has been found that activated carbons made according to the process of the subject invention perform satisfactorily in sorption processes, in particular, the sorption of sulfur dioxide, in the form of sulfuric acid, onto the activated carbon particles.

The practice of this invention may clearly be seen in the following examples.

EXAMPLE 1

A sodium salt of an alkali lignin was added to a sodium hydroxide solution such that the end result was 200 grams of precipitable lignin in a 1,500-gram sodium lignate solution. Precipitation of the lignin was obtained by adding a 3,100-gram cobalt nitrate solution having 3.23 percent cobalt nitrate. The ratio of cobalt nitrate solution to the sodium lignate solution was maintained at a ratio of 1.72 mols of cobalt per mol of lignin. The cobalt nitrate solution and the sodium lignate solution were mixed together in the same vessel and a precipitate was formed. The cobalt lignate precipitate was then separated from the slurry by use of a filter. The precipitate was washed with water to remove any excess metal salt adhering to the surface of the cobalt lignate precipitate. The cobalt lignate precipitate was oven dried at 221°F.

The dry cobalt lignate was then carbonized and finally activated in a 4-inch fluidized bed filled with the dry cobalt lignate and heated at 1,500°F. with 30 percent steam and 70 percent nitrogen flowing through the bed at a velocity of 1.5 feet per second. The apparent density of the 87-gram charge was 0.810 gm/cc. Following activation, 36 grams of activated metal lignate having an apparent density of 0.222 gm/cc and a M.V. of 90 were recovered.

An electron micrograph was made of the activated carbon containing active cobalt sites and is shown in the accompanying figure wherein the light areas disclose the metal sites. It should be appreciated that this electron micrograph is at a magnification of 55,700 times the original size. It can be stated that the active metal sites are uniformly distributed on this activated carbon. In addition, it should be appreciated that the metal sites are in small pores which would be inexcessible to liquid penetration as with the impregnation method of producing metal sites on activated carbon. It should also be appreciated that during the process of the present invention control of the metal sites is possible thereby effectuating the end results desired.

EXAMPLE 2

Two thousand grams of sodium lignate solution were diluted with 10,000 grams of water, placed in a large pot and agitated while adding 400 grams of aluminum sulfate and mixing continued for 30 minutes. The pH was 4.0. The aluminum lignate was filtered and spray dried at 365°F. inlet and 200°F. outlet to yield 161 grams of the aluminum lignate for activation.

EXAMPLE 3

To 1,500 grams of a solution of the sodium salt of an alkali lignin were added 100 grams of nickelous acetate which had been dissolved in 3,000 ml. of water and mixing continued at low speed for 30 minutes. The nickel lignate precipitate at pH 7.9 was heated to 200°F. to facilitate filtering. The filtered nickel lignate was washed with 4 liters of water and the wet filter cake had 15 percent solids which was dried in an oven at 230°F. to yield a dry nickel lignate for activation. Nickel lignate (238.1 grams at an apparent density of 0.807 gm/cc) was simultaneously carbonized and activated in a 4-inch fluidized bed at 1,750°F. with 100 percent inlet nitrogen gas flowing through the bed at a velocity of 1.0 – 1.5 feet per second. Upon activation 57.0 grams of activated carbon containing nickel distributed evenly throughout and having an apparent density of 0.295 grams/cc were recovered.

EXAMPLE 4

A copper lignate was made by adding 1,500 grams of a sodium lignate solution with rapid agitation to 100 grams of cupric sulfate dissolved in 3,000 ml. of water. The slurry had a pH of 5.7 and was heated to 200°F. to aid filtration. The filtered wet cake having a solids of 22.0 percent was dried in an oven at 214°F. The dry copper lignate may then be activated.

EXAMPLE 5

A ferric lignate was made by adding 1,500 grams of a sodium alkali lignin solution to 3,000 ml. of an aqueous solution containing 100 grams of ferric chloride and rapidly mixing for 30 minutes. The ferric lignate slurry had a pH of 3.2 and was heated to 200°F., filtered and washed. The wet cake had a solids content of 25.2 percent and was dried at a low temperature. The dry ferric lignate may then be activated.

EXAMPLE 6

To illustrate the sorbing ability for sulfur dioxide the activated carbons having active cobalt (from Example 1) and nickel (from Example 3) sites were placed in a fluidized bed sorber and a sulfur dioxide containing gas passed there through. It was found that the nickel containing activated carbon picked up 0.206 milligrams of $SO_2$/ gram of carbon sample/ minute. The cobalt carbon picked up 0.585 milligrams/ gram of carbon sample minute.

Other embodiments of activated carbon from metal lignates are possible, the disclosed being, of course, merely exemplary. Because many varying and different embodiments may be made within the scope of the invention concept herein taught, and because many modifications may be made in the embodiments herein detailed in accordance with the description requirements of the law, it is to be understood that the details are to be interpreted as illustrative and not in a limiting sense.

What is claimed is:

1. A process for producing activated carbon containing active metal sites which comprises:
   a. mixing a non-sulfonated aqueous lignate solution with an aqueous solution containing a transition metal salt at a mol ratio of 2:1 to 1:1 metal salt to lignate to thereby precipitate a transition metal lignate;
   b. recovering said transition metal lignate precipitate;
   c. drying said recovered transition metal lignate precipitate;
   d. carbonizing said transition metal lignate precipitate at a temperature between 700°F. and 1,800°F.; and
   e. activating said carbonized transition metal lignate at a temperature between 1,400°F. and 1,950°F.

2. The process of claim 1 wherein said lignin is alkali lignin.

3. The process of claim 1 wherein said lignin is a hexamethylene tetramine modified lignin.

4. The process of claim 1 wherein said transitional metal is a member of the group consiting essentially of cobalt, aluminum, nickel, copper and iron.

5. The process of claim 1 wherein said metal lignate is recovered by filtering.

6. The process of claim 5 wherein said recovered lignin is washed prior to drying to remove any excess metals salt.

7. The process of claim 1 wherein the metal lignate is dried and carbonized co-currently.

8. The process of claim 1 wherein the dry metal lignate is carbonized and activated co-currently.

9. The activated carbon product having active metal sites made by the process according to claim 1.

* * * * *